United States Patent [19]

Sorg

[11] Patent Number: 4,954,550

[45] Date of Patent: Sep. 4, 1990

[54] SYSTEM FOR THERMOPLASTIC CROSS-LINKING ADHESIVES, THEIR PREPARATION AND A CORRESPONDING METHOD OF GLUING

[75] Inventor: Kurt Sorg, Eragny, France

[73] Assignee: Societe Chimique des Charbonnages S.A., France

[21] Appl. No.: 163,753

[22] PCT Filed: Jun. 22, 1987

[86] PCT No.: PCT/FR87/00237

§ 371 Date: Apr. 1, 1988

§ 102(e) Date: Apr. 1, 1988

[87] PCT Pub. No.: WO88/00225

PCT Pub. Date: Jan. 14, 1988

[30] Foreign Application Priority Data

Jun. 27, 1986 [FR] France ................................ 86 09391

[51] Int. Cl.$^5$ ......................... C08L 5/01; C08L 5/11; C08L 5/12; C09J 153/02

[52] U.S. Cl. .................................... 524/271; 524/296; 524/297; 524/306; 524/474; 524/487; 524/906; 525/89; 525/92; 525/93; 525/98; 525/939

[58] Field of Search ............... 524/270, 271, 272, 274, 524/296, 297, 306, 474, 487, 906; 525/423, , 89, 93, 95, 97, 92, 98, 939

[56] References Cited

U.S. PATENT DOCUMENTS

| | | | |
|---|---|---|---|
| 3,100,160 | 8/1963 | Korpman | 117/122 |
| 3,639,500 | 2/1972 | Muny et al. | 260/837 |
| 3,919,348 | 11/1975 | Foster et al. | 525/524 |
| 4,070,225 | 1/1978 | Batdorf | 525/423 |
| 4,082,708 | 4/1978 | Mebta | 525/423 |
| 4,207,220 | 6/1980 | Godfrey | 524/274 |

FOREIGN PATENT DOCUMENTS 2554112 10/1983 France .

OTHER PUBLICATIONS

PCT International Search Report for PCT/FR87/00237, mailed Nov. 9, 1987.
5 Patent Abstracts No. 62(C–52)(734), Apr. 25, 1981.
82 Chemical Abstracts No. 20, 126222K, May 19, 1975.

*Primary Examiner*—Allan M. Lieberman
*Attorney, Agent, or Firm*—Finnegan, Henderson, Farabow, Garrett & Dunner

[57] ABSTRACT

System for thermoplastic cross-linking adhesive, preparation thereof and corresponding method of gluing.

This system for thermoplastic adhesives includes (A) a first composition without anhydride groups, containing: (a) at least one polymer chosen from the thermoplastic polymers and the synthetic rubbers; (b) at least one compound containing at least one group which can react with anhydride groups; (c) at least one tackifying resin; and (d) if desired, at least one plasticizer; (B) a second composition containing constituents Ba, Bc and Bd which are respectively analogous to the constituents Aa, Ac and Ad, and (b) at least one polymer containing anhydride goups; and (C) at least one activator of the reaction between the reactive groups of Ab and the anhydride functions of Bb. Advantageously the activatior (C) is wholly incorporated in the composition A and/or in the composition B, so as to form a two-component system.

13 Claims, No Drawings

SYSTEM FOR THERMOPLASTIC CROSS-LINKING ADHESIVES, THEIR PREPARATION AND A CORRESPONDING METHOD OF GLUING

The present invention relates to systems for thermoplastic adhesives which have the peculiarity, after application to the surfaces to be glued, of leading to a product which is cross-linked in a substantially irreversible way, making it non-melting or melting only with difficulty. It likewise relates to the preparation of these systems, as well as to a corresponding method of gluing.

The systems for thermoplastic adhesives capable of cross-linking, in accordance with the present invention, have the double advantage of being adapted for use in a very simple manner in industrial installations, especially automated installations (robots) such as those of the automobile industry, and of being capable of application to numerous types of objects made from very diverse materials, such as wood, metals, woven or non-woven textiles, glass, porcelain, ceramics, cardboard, paper, stone, cement and plastics materials. In particular, they present an excellent capacity for adhesion between closed non-porous substrates, such as polystyrene, untreated polyethylene, untreated polyvinyl chloride, the acrylonitrile-butadiene-styrene rubbers, polymethyl methacrylate, glass, metals, surface-treated papers, film-coated papers, papers covered with a layer of varnish hardened by ultra-violet radiation.

This wide field of application of the thermoplastic adhesives according to the present invention deserves to be underlined.

We will mention in particular the specially interesting use of the systems according to the invention for bookbinding. In this field, the gluing methods known to date are:

(1) gluing by means of an aqueous dispersion in one or several applications;

(2) gluing in one or two applications, with the aid of a traditional thermoplastic glue, i.e. a composition which is solid at ambient temperature but which, after melting, hardens by cooling;

(3) mixed adhesion, with an application of vinyl glue and an application of thermoplastic glue; and (4) gluing with the aid of a thermoplastic polyurethane glue.

Method (1) requires a long drying time; method (2), in the case of a single application, leads to a resistance to tearing out of the pages which is relatively limited both in the cold and in the hot, and in the case of a second application leads to a weak adhesion of the second coat on the first; method (3) suffers from the disadvantage of the length of time needed for drying the vinyl glue, which is in danger of failing to bond well to the thermoplastic glue if not well dried - a thing difficult to control on a machine; as regards method (4) it has the disadvantage that the thermoplastic polyurethane glues remain sticky as long as the cross-linking has not finished, so that during all that period it is not possible to effect the trimming of the books without a risk of fouling; furthermore, the thermoplastic polyurethane glues require an addition of water for cross-linking, which is not easy to add with film-coated book covers and closed laminated papers. With the compositions according to the present invention, the above disadvantages are overcome.

The systems for adhesives according to the present invention are mainly systems with two components (hereinafter called A and B), one containing mainly anhydride groups, and the other containing mainly groups capable of reacting with the latter, once the anhydride rings have been opened. These compounds can, each according to its kind, be melted and maintained in fusion for a relatively long time (a minimum of eight hours: such times being compatible with the exigencies of use on the industrial scale) and can be cooled and re-melted without causing cross-linkage. At the time of use, the two components are contacted in the melted state (by intimate mixing or by depositing a layer of the one on a layer of the other), and the expected cross-linking takes place under the effect of a rise in temperature.

This cross-linking mechanism between open anhydride groups and other reactive groups is known per se, but it has never been applied to industrial adhesive methods. Thus, in French Patent Application No 2 554 112 there is described an application to the coating of a substrate with a composition comprising a polymer of ethylene and of maleic anhydride, a polyepoxy compound and a catalyst of reaction between anhydride and epoxy functions, and the use of this composition as a thermoplastic adhesive is mentioned. The cross-linkage starts on mixing the ingredients and proceeds from then on in a progressive manner. This method cannot be used on a large scale, because it requires in practice that mixing shall be effected directly on the machine which is applying the adhesive, a thing which cannot be effectively carried out in industrial installations.

In the field of bookbinding, the systems according to the invention need no supply of external agents for cross-linking, since the components A and B contain all the ingredients. The books are immediately ready for trimming, as in the case of conventional thermoplastic glues. The two layers, each consisting of one component mentioned above in the molten state, undergo chemical reaction at their contact interface, bringing no risk of ungluing at that place. Books bound in this fashion have a very good behaviour in the cold, and a hard spine or a very flexible spine can be obtained according to the formulations.

Another advantage of the constituents of the systems according to the present invention should be mentioned, namely that of being thixotropic in the case where a specific ingredient is incorporated. This advantage is interesting in a certain number of fields, especially building, construction etc. Non-thixotropic glues have a tendency to run when they are projected onto a ceiling. Thixotropic glues set much more quickly by change of viscosity as soon as the forced propulsive treatment ceases. Glue applied in this way thickens instantly while remaining sticky, and it preserves its open (setting) time as a result. There are obtained the advantages of proper working, without splashing of personnel or fouling of robots etc.

The present invention therefore seeks to provide a system for thermoplastic adhesive having the above-mentioned properties, which is characterized by the fact that it comprises:

(A) a first composition not containing any anhydride groups and comprising;

(a) at least one polymer chosen from thermoplastic polymers and synthetic rubbers;

(b) at least one compound containing at least one group capable of reaction with anhydride groups;

(c) at least one tackifying resin; and (d) if desired, at least one plasticizer;

(B) a second composition comprising;
 (a) at least one polymer chosen from thermoplastic polymers and synthetic rubbers;
 (b) at least one compound containing at least one anhydride group;
 (c) at least one tackifying resin; and
 (d) if desired, at least one plasticizer; and
(C) at least one activator of the reaction between the reactive groups of constituent Ab and the anhydride functions of constituent Bb.

For preference, the molar ratio of the reactive groups of constituent Ab to the anydride groups of constituent Bb is at least equal to 1, and the molar ratio of the activator C to the anhydride groups of constituent Bb is at least equal to 0.5, for greater preference at least equal to 1.

Moreover, for 100 parts by weight of the composition A, the latter comprises in particular:
 from 25 to 60 parts by weight of constituent Aa;
 from 1 to 20 parts by weight of constituent Ab;
 from 5 to 60 parts by weight of constituent Ac; and
 from 0 to 20 parts by weight of constituent Ad.

Likewise, for 100 parts by weight of the composition B, the latter comprises in particular:
 from 50 to 30 parts by weight of constituent Ba;
 from 20 to 60 parts by weight of constituent Bb;
 from 5 to 60 parts by weight of constituent Bc; and
 from 0 to 20 parts by weight of constituent Bd.

The thermoplastic polymers which enter into the definition of the constituents Aa and Ba are chosen for preference from the group consisting of $C_2$–$C_{12}$ alkene/$C_1$–$C_{12}$ alkyl (meth)acrylate copolymers, and the polymers of norbornene and/or of its derivatives.

As for the synthetic rubbers which enter into the definition of the constituents Aa and Ba, they are chosen for preference from the styrene-diene-styrene block copolymers, wherein the dienes are butadiene, isoprene, etc.

In accordance with a first embodiment of the system for thermoplastic adhesive according to the invention, the component Ab contains at least one epoxide group.

The compound Ab can thus be a polyepoxy compound of the general formula:

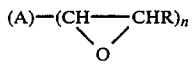

in which A is a polyfunctional group of valency $n \geq 2$, and R is a hydrocarbon radical or a hydrogen atom. By way of example there may be mentioned the polyglycidyl ethers of polyhydroxylated compounds. Among these there are chosen either the polyepoxy compounds of the aromatic type (such as those derived from bisphenol (A), or the polyepoxy compounds of the aliphatic type, especially the polyglycidyl ethers of polyalcohols, such as the diglycidyl ethers of $\alpha$- $\omega$ diols e.g. the diglycidyl ether of butane diol, of hexane diol, of p-cyclohexyl dimethanol, of neopentyl glycol, or such as the triglycidyl ethers of triols eg trimethylol propane triglycidyl ether or glycerol triglycidyl ether, or such as the tetraglycidyl ethers of tetrols eg pentaerythritol tetraglycidyl ether. Among the compounds arising from the epoxidation of olefinic compounds, there is advantageously chosen epoxidated soya oil.

It is likewise possible to use, as component Ab, a copolymer of at least one $C_2$–$C_8$ olefine with at least one unsaturated monomer containing an epoxy group, such as, especially, an acrylate or methacrylate of glycidyl.

Such a copolymer can be obtained either by grafting the unsaturated monomer onto the olefine (co)polymer chain, or directly by copolymerization of the unsaturated monomer with the $C_2$–$C_8$ olefine. Such a copolymer can also comprise groups derived from another unsaturated monomer such as an alkyl acrylate or methacrylate. Such copolymers have been described especially in the patent US-A- 3 383 372.

In accordance with a second embodiment of the system for thermoplastic adhesive according to the invention, the compound Ab contains at least one amine group. By way of example of such compound Ab there may be mentioned a polyamide with free amine functions, as to which case it may be observed that the component which is formed from the corresponding composition, surprisingly, has a thixotropic character.

Polyamides which can be used are, in particular, polyamides obtained from (a) 35 to 49.5 mole % of dimeric fatty acid, (b) 0.5 to 15 mole % of monomeric fatty acid with a chain length of 12 to 22 carbon atoms, (c) 2 to 35 mole % of polyether amine of the general formula:

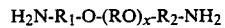

in which x represents a number lying between 8 and 80, in particular between 8 and 40; $R_1$ and $R_2$ represent aliphatic and/or cycloaliphatic hydrocarbon residues, which may be the same or different; and R represents an optionally branched aliphatic hydrocarbon residue having 1 to 6 carbon atoms, and (d) 15 to 48 mole % of aliphatic diamine containing 2 to 40 carbon atoms in the carbon skeleton, wherein up to 2/3 of the dimeric fatty acids can be replaced by aliphatic dicarboxylic acids having 4 to 12 carbon atoms; and polyamides obtained from (a) 20 to 49.5 mole % of dimeric fatty acids, (b) 0.5 to 15 mole % monomeric fatty acids with a chain length of 12 to 22 carbon atoms; and (c) up to 20 to 55 mole % of an amine carrying at least two primary amino groups and having 2 to 40 carbon atoms in the carbon skeleton, wherein up to 2/3 of the dimeric fatty acids can be replaced by aliphatic dicarboxylic acids having 4 to 12 carbon atoms. These polyamides advantageously have terminal acid groups, their acid index running from 1 to 50, but for preference from 2 to 30, especially from 4 to 12; they can also carry terminal amino groups, so that their amine index runs from 2 to 15, especially from 4 to 10.

In accordance with a third embodiment of the system for thermoplastic adhesive according to the invention, the compound Ab carries at least one function chosen from alcohol and thiol. In particular there may be mentioned diols such as ethylene glycol, propylene glycol and their polymers. The compound Ab may likewise simultaneously carry an alcohol function and an amine function, as does for example ethanolamine.

The compound Bb is, in particular, a polymer containing groups chosen from the maleic, itaconic and phthalic anhydride groups etc, especially maleic anhydride.

This polymer (Bb) may likewise contain, apart from groups derived from an anhydride, groups derived from at least one alkene and, if desired, groups derived from at least one comonomer, chosen especially from among the $C_1$–$C_{12}$ alkyl acrylates and methacrylates. Such copolymers can be obtained either by direct copolymerization of the monomers or by grafting the anhydride onto a homopolymer of the alkene or onto a copolymer of the other monomers (alkene; (meth)acrylate). In the case of direct copolymerization, the anhydride content of the copolymer is generally lower than or equal to 3 mole %. In the case of grafting, the anhydride content of the copolymer can be as much as 20 mole %.

The tackifying resins Ac and Bc are chosen especially from among the polyterpenes, (with novolac functional groups if desired), the colophonies and colophony esters, as well as their hydrogenated derivatives, and also the petroleum resins. The petroleum resins which can be used in the systems according to the invention are resins prepared from hydrocarbon fractions arising from cracking of naphtha vapour, such as, on the one hand aromatic fractions containing at least one monomer chosen from styrene and its derivatives, the vinyltoluenes and the alkylbenzenes and, on the other hand, aliphatic fractions containing a monomer, itself containing from 5 to 6 carbon atoms, such as cyclopentadiene and its derivatives, and cyclohexadiene.

The plasticizers (Ad and Bd) are chosen mainly, on the one hand, from among the semi-aliphatic oils, the polyisobutylenes of very low molecular weight, and the aromatic, naphthenic or paraffinic petroleum oils, the alkyl benzenes and, on the other hand, the esters derived from saturated organic acids such as alkyl phthalates, adipates, sebacates and azelates. By way of examples of the latter, there may be mentioned diethyl, dibutyl, dicyclohexyl, diethylhexyl, dioctyl, didecyl and butylethylhexyl phthalates, dibutyl, dioctyl and diisooctyl adipates, dibutyl, dioctyl and diisooctyl sebacates, dioctyl and diisooctyl azelates. As plasticizers (Ad and Bd) there may be likewise mentioned the copolymers of ethylene and vinyl acetate of very low molecular weight (of the order of 1000–1500), one example of such a copolymer being the one which contains 28% by weight vinyl acetate.

The activator C is chosen particularly from among the tertiary amines, such as Dimethyl p-toluidine, Dimethyl laurylamine, N-Butyl morpholine, N,N-Dimethyl cyclohexylamine, Benzyl dimethylamine, pyridine, Dimethylamino-4-pyridine, Methyl-1-imidazole, Tetramethyl ethylene diamine, Tetramethyl guanidine, Tetramethyl hydrazine, N,N-Dimethyl piperazine, N,N,N',N'-Tetramethyl-1,6-hexane diamine; the phosphines such as Triphenyl phosphine; aryl or alkylphosphonium halides, such as Ethyl triphenylphosphonium iodide; and the tertiary amides of fatty acids, such as the tertiary amides of soya fatty acids. Phosphines and aryl or alkyl phosphonium halides are used with advantage in the case where the chosen compound Ab contains at least one epoxy group.

Furthermore, at least one of the compositions A and B may contain up to 10 parts by weight, per 100 parts by weight of said composition, of at least one adjuvant such as a wax or paraffin, eg polyethylene wax.

Similarly, at least one of the compositions A and B may contain up to 5 parts by weight, per 100 parts by weight of said composition, of at least one mineral filler, chosen mainly among silica, alumina, the mineral silicates, aluminates, and silicoaluminates, and talc.

Likewise, at least one of the compositions A and B may contain up to 1 part by weight, per 100 parts by weight of said composition, of at least one antioxidant chosen especially among 2,6-Di-tert-butyl-p-cresol, bis-Hydroxyanisole, 2,2'-Thiodiethyl-bis-3-(3,5-di-tert-butyl-4-hydroxyphenyl) propionate, tetrakis-[Methylene 3-(3',5'-di-tert-butyl-4'-hydroxyphenyl)-propionate]methane, 2,4-bis-N-Octylthio-6-(4-hydroxy-3,5-di-tert-butylanilino)-1,3,5-triazine, 3,5-Di-tert-butyl-4-hydroxy-3-phenyl propionate and Octadecyl-3,5-di-tert-butyl-4-hydroxyhydrocinnamate.

The present invention relates equally to systems as defined above in which the activator C is at least partially incorporated in the composition A and/or in the composition B. The activator C may advantageously be totally incorporated in the composition A and/or in the composition B so as to form a two-component system.

According to one particular embodiment, the aforementioned two-component system also comprises a film of thermoplastic material which is chemically inert with respect to each of the two components and carries on each of its faces a layer of one of said components, so as to form a three-layer film. The inert film will consist for example of polyethylene or polypropylene, or again of an ethylene/alkyl acrylate or ethylene/vinyl acetate copolymer.

The present invention likewise relates to a method for preparing a two-component system as defined above, that is to say a system in which the activator C is completely incorporated in the composition A and/or in the composition B. This method is characterized by the fact that the components of the composition A and those of the composition B are separately mixed at a temperature sufficient for obtaining homogeneous liquids, and that each of the two liquid mixtures is cooled while incorporating the activator C into at least one of said compositions A and B.

For preference, the constituents of each composition A and B are mixed at a temperature which is at least 10° higher than the softening point of said composition, for example between 120° C. and 170° C. The temperature of the composition at which the activator (C) is incorporated is comprised for the most part between 120° C. and 170° C.

In the case where the two-component system also comprises a three-layer film as defined above, the aforementioned method includes, after the preparation of the two components, the step which consists of applying one of them to one face of said film and the other to the other face. The application of one component to one face of the film can be carried out by coextrusion, or by coating, for example on a roller or by means of a flat draw-plate.

The present invention is likewise directed to a method of gluing two objects, characterized by the fact that both of the components of the two-component system as defined above are brought to a temperature lying between 120° C. and 220° C., and then:

either they are intimately mixed at that temperature, and the resulting thermoplastic adhesive is applied to at least one of the two objects to be glued, and finally one of the two glued objects is applied against the other, or the two components are separately applied, either one after the other onto one of the two objects to be glued, or one onto one of the objects to be glued and the other onto the other object to be glued, and then the two objects are applied one to the other.

It is sometimes desirable, after having applied the two objects one against the other, to heat the assembly for a sufficient interval to achieve cross-linking.

The invention relates likewise to a method of gluing two objects with the aid of the system consisting of the above mentioned three-layer film, this method being characterized by the fact that the two objects are assembled by means of a three-layer film, the assembly is then brought to a temperature higher than the melting point of the inert thermoplastic film, and sufficient to permit migration of one of the compounds (Ab and Bb) towards the other, whereby their making contact causes cross-linking of the system.

By way of further illustration of the subject matter of the present invention, there will now be described several exemplary embodiments. In these examples, the indicated percentages are given in weight, unless there is an indication to the contrary.

The various polymers trademarked "LOTADER" marketed by the company "CdF CHIMIE TER-POLYMERES" which are used in these examples, have the properties indicated in Table 1 below. The polymers of this series, having the references HX 8230 and HX 8280 are ethylene/butyl acrylate copolymers, and those having the references HX 8210 and HX 8290 are ethylene/maleic anhydride/ethyl acrylate terpolymers.

TABLE 1

| Reference LOTADER | HX 8210 | HX 8230 | HX 8280 | HX 8290 |
| --- | --- | --- | --- | --- |
| F.I. (dg/min) | 200 | 20 | 175 | 70 |
| % M.A. | 1.1 | 0 | 0 | 1.2 |
| % Acryl | 1.8 | 4.3 | 7.9 | 5.6 |

In this table,

F.I. designates the fluidity index of the polymer, determined at 190° C. under 2.16 kg according to the ASTM D-1238 standard.

% M.A. and % Acryl respectively designate the molar percentages of maleic anhydride and of ethyl or butyl acrylate as the case may be, the molar proportion of ethylene in these polymers being represented by the balance necessary to make 100%.

The antioxidants used in these examples are:
2,6-Di-tert-butyl p-cresol;
3,5-Di-tert-butyl-4-hydroxy-3-phenyl propionate;
Octadecyl 3,5-di-tert-butyl-4-hydroxy hydrocinnamate;
2,2'-Thiodiethyl-bis-3-(3,5-di-tert-butyl-4-hydroxyphenyl) propionate;
2,4-bis-N-Octylthio-6-(4-hydroxy-3,5-di-tert-butyl-anilino)-1,3,5-triazine;
(all) sold by the firm "CIBA-GEIGY" under the names "IRGANOX" PS 800, 1010, 1076, 1035 and 565 respectively.

I - PREPARATION OF DIFFERENT COMPONENTS A AND B

The following formulations a1 to a3 and b1 to b3 are prepared:

| FORMULATION a1 | |
| --- | --- |
| Polyisobutylene (plasticizer) sold under the name "NAPVIS D-10" by the firm "BP" | 5% |
| Epoxy resin sold under the name "EPIKOTE 828" by the firm "SHELL" | 10% |
| Hydrogenated aliphatic petroleum resin (C8 cut: tackifying resin) sold under the name "ESCOREZ 5300" by the firm "ESSO" | 44.2% |
| "LOTADER HX 8230" | 25% |
| "LOTADER HX 8280" | 15% |
| 2,6-Di-tert-butyl-p-cresol (antioxidant) | 0.25% |
| 3,5-Di-tert-butyl-4-hydroxy-3-phenyl propionate (antioxidant) | 0.25% |
| Triphenylphosphine | 0.3% |
| FORMULATION a2 | |
| Aliphatic oil (plasticizer) sold under the name "PRIMOL 352" by the firm "ESSO" | 22% |
| Naphthenic oil (plasticizer) sold under the name "PIONIER" | 4.2% |
| Polynorbornene in powder form, of mean molecular weight 2,000,000, sold under the name "NORSOREX F" by "SOCIETE CHIMIQUE DES CHARBONNAGES" | 1.8% |
| Hydrogenated aliphatic petroleum resin (C8 cut tackifying resin) sold under the name "ESCOREZ 5320" by the firm "ESSO" | 39.7% |
| Epoxy resin, sold under the name "EPIKOTE 828" by the firm "SHELL" | 10% |
| Styrene-butadiene-styrene rubber, sold under the name "CARIFLEX TR 1102" by the firm "SHELL" | 17% |
| Styrene-butadiene-styrene rubber, sold under the name "CARIFLEX TR 1107" by the firm "SHELL" | 4% |
| Octadecyl 3,5-di-tert-butyl-4-hydroxy hydrocinnamate (antioxidant) | 0.5% |
| 2,2'-Thiodiethyl-bis-3-(3,5-di-tert-butyl-4-hydroxyphenyl) propionate (antioxidant) | 0.1% |
| 2,4-bis-N-Octylthio-6-(4-hydroxy-3,5-di-tert-butylanilino)-1,3,5-triazine (antioxidant) | 0.05% |
| 2,6-Di-tert-butyl-p-cresol (antioxidant) | 0.35% |
| Triphenylphosphine | 0.3% |
| FORMULATION a3 | |
| Polyethylene wax, sold under the name "EPOLENE C-16" by the firm "KODAK" | 5% |
| Fisher Tropsch wax, sold under the name "SASOLWAX H-2" | 6% |
| Polyisobutylene (plasticizer) sold under the name "NAPVIS D-200" by the firm "BP" | 6% |
| Phenolic terpene tackifying resin, sold under the name "URAVAR 75205" by the firm "DSM" | 19.7% |
| Polyepoxy resin, sold under the name "EPIKOTE 828" by the firm "SHELL" | 15% |
| Aliphatic petroleum resin (tackifying resin) sold under the name "ESCOREZ 5380" by the firm "ESSO" | 19.5% |
| "LOTADER HX 8230" | 7% |
| "LOTADER HX 8280" | 20% |
| Antioxidants | 0.5% |
| Triphenylphosphine | 0.3% |
| FORMULATION b1 | |
| Polyisobutylene (plasticizer) sold under the name "NAPVIS D-10" by the firm "BP" | 5% |
| Phenolic terpene resin (tackifying resin) sold under the name "DERTOPHENE T" by the firm "DRT" | 15% |
| Hydrogenated colophony (tackifier) having an acid index of about 160, sold under the name "FORAL AX" by the firm "HERCULES" | 16% |
| Poly-(alpha-methyl styrene) (tackifier) sold under the name "URATAK 68520" by the firm "DSM" | 19.5% |
| "LOTADER HX 8290" | 25% |
| "LOTADER HX 8210" | 15% |
| 2,6-Di-tert-butyl-p-cresol (antioxidant) | 0.25% |
| 3,5-Di-tert-butyl-4-hydroxy-3-phenyl propionate (antioxidant) | 0.25% |
| Tertiary amines of soya fatty acids (activator) | 4% |
| FORMULATION b2 | |
| Wax sold under the name "MOBILWAX 145" by the firm "MOBIL" | 5% |
| Hydorgenated aliphatic petroleum resin (tackifying resin) sold under the name "ESCOREZ 5380" by the firm "ESSO" | 26% |
| Poly-(alpha-methyl styrene) (tackifier) sold under the name "URATAK 68520" by the firm "DSM" | 20% |
| Copolymer sold under the name "ESCORENE MV 2514" by the firm "ESSO" | 4.4% |
| Polyamide having an amine index of 9 and an acid index below 1, sold under the name "EURELON 2140" by the firm "SCHERING" | 0.2% |
| Styrene-butadiene-styrene polymer, sold under the name "EUROPREN T163" by the firm "ENICHEM" | 5% |
| Tertiary amines of soya fatty acids | 3.6% |
| "LOTADER HX 8210" | 19.7% |
| "LOTADER HX 8290" | 16% |
| 2,2-Thiodiethyl-bis-3-(3,5-di-tert-butyl-4-hydoxyphenyl) propionate (antioxidant) | 0.2% |
| 2,6-Di-tert-butyl-p-cresol | 0.2% |
| FORMULATION b3 | |
| Wax sold under the name "MOBILWAX 145" by the firm "MOBIL" | 4% |

-continued

| | |
|---|---|
| Polyethylene wax, sold under the name "EPOLENE C-16" by the firm "KODAK" | 3% |
| Polyisobutylene (plasticizer) sold under the name "NAPVIS D-200" by the firm "BP" | 5% |
| Tackifying resin, sold under the name "FORAL AX" by the firm "HERCULES" | 14% |
| Aliphatic petroleum resin sold under the name "ESCOREZ ECR 327" by the firm "ESSO" | 7% |
| Aliphatic petroleum resin sold under the name "ESCOREZ 4410" by the firm "ESSO" | 21.5% |
| "LOTADER HX 8210" | 24% |
| "LOTADER HX 8290" | 18% |
| 3,5-Di-tert-butyl-4-hydroxy-3-phenyl propionate (antioxidant) | 0.25% |
| 2,6-Di-tert-butyl-p-cresol (antioxidant) | 0.25% |
| Dimethyl-p-toluidine | 1% |

The various constituents of each are mixed together at a temperature of the order of 150° C. After cooling of the liquid mixtures thus obtained, down to ambient temperature the components A1 to A3 and B1 to B3 respectively are obtained. The properties of these various components are shown in Table II which follows.

TABLE II

| Properties of the components A and B | | | | | | |
|---|---|---|---|---|---|---|
| | A1 | A2 | A3 | B1 | B2 | B3 |
| Viscosity at 175° C. (centipoises) | 2250 | ≈2000 | 2750 | 4600 | 6750 | 3900 |
| Softening point (°C.) | 93 | ≈82 | 95.5 | 94 | 95 | |
| Open* time (seconds) | 3.5 | nd | 5.5–6 | 3.5 | 3–4 | 4–4.5 |
| Breaking strain at 50 mm/minute (N) | nd | nd | nd | 50 | 45 | 35 |
| Extension at break (%) | nd | nd | nd | 285 | 260 | 220 |

*Time for which the component, applied in a thin layer on the surface to be glued, preserves its adhesive character; nd = not determined.

The component B2 has the surprising peculiarlity of being thixotropic, as appears from the following viscosity measurements:

Viscosity at 10 rpm=5950 cps

Viscosity at 100 rpm=7400 cps

II - APPLICATION OF DIFFERENT ADHESIVES MADE UP BY ASSOCIATION OF ONE COMPONENT A AND, ONE COMPONENT B.

APPLICATION EXAMPLE I:

Bookbinding.

In this example, the components A1 and B2 are used, to effect the binding of volumes of the "telephone directory" type, catalogues or books.

The bundles of printed sheets are caused to pass over a first vat of a bookbinding machine containing the liquid component A1 which has been brought to a temperature of 200° C., so as to effect the deposition of a thin layer of this component A1 on the spine. A few seconds later the operation is recommenced above a second vat containing the liquid component B1 which has been brought to a temperature of 180° C., so as to effect the application of a second layer consisting of the component B1, on top of the aforementioned first layer. Some seconds later, the cover of the volume is put in position, the inside face of the spine of which is applied against the aforementioned second adhesive layer.

The solidity of this binding was tested by comparison with a binding effected with the aid of a known thermoplastic adhesive, according to the tearing test in which a page of the volume is pulled out in a direction perpendicular to the plane of the binding, and the necessary force (expressed in Newtons) to effect this tearing is measured. The results are set out in Table III which follows:

TABLE III

| Results of tearing tests on one page. | | | | |
|---|---|---|---|---|
| Paper type | Known thermoplastic adhesive* | | Thermoplastic adhesive of example 1 | |
| TIEFDRUCK 100g (Helio paper) | 4.2 | (3h)** | 5.1 (3h) | 6.6 (1 week) |
| LEXICOTHECK OFFSET | 4.2 | (3h) | 6.2 (3h) | 6.7 (1 week) |
| REISEKATALOG HELIO | 2.1 | (2h) | 4.3 (2h) | 5.0 (1 week) |
| THURGANISCHE BRUECKEN | 1.5 | (3h) | 3.8 (3h) | 4.8 (1 week) |

*"Techmomelt Q 3207" of the firm HENKEL.
**Time elapsed between binding and testing.

It is determined that the force necessary for tearing one page is distinctly higher in the case of binding with the adhesive according to the invention.

Moreover it is observed that the volume bound with the adhesive according to the invention is not thereby any less well adapted for lying flat when opened.

APPLICATION EXAMPLE II:

Adhesive assembly of two greasy metal sheets.

The components A2 and B3, previously brought to a temperature of 150° C., are intimately mixed together. The mixture is applied in a thin layer onto a first metal sheet which has not been degreased, and to which a second metal sheet, likewise not degreased, is immediately applied. The assembly thus created is brought to a temperature of the order of 170°–180° C. in an oven. The cross-linking is finished after several seconds.

Excellent adhesion is obtained, even though the metal sheets had not been degreased, and this much more rapidly than with the conventional epoxy or polyurethane glues. Such a result is of interest on a practical level, especially in the field of the automobile industry.

I claim:

1. A system for a thermoplastic cross-linking adhesive comprising:
   (A) a first composition not containing any anhydride groups and comprising per 100 parts per weight of said first composition:
      (a) from 25 to 60 parts by weight of at least one polymer chosen from thermoplastic polymers and synthetic rubbers;
      (b) from 1 to 20 parts by weight of at least one compound containing at least one group capable of reacting with anhydride groups;
      (c) from 5 to 60 parts by weight of at least one tackifying resin; and
      (d) 0 to 20 parts by weight of at least one plasticizer;
   B. a second composition containing per 100 parts per weight of said second composition:
      (a) from 50 to 30 parts by weight of at least one polymer chosen from thermoplastic polymers and synthetic rubbers;

(b) from 20 to 60 parts by weight of at least one compound containing at least one anhydride group;

(c) from 5 to 60 parts by weight of at least one tackifying resin; and (d) from 0 to 20 parts by weight of at least one plasticizer;

c. at least one activator of the reaction between the reactive groups of the constituent Ab and the anhydride functions of the constituent Bb;

wherein the molar ratio of the reactive groups of the constituent Ab to the anhydride groups of the constituent Bb is at least equal to 1, and the molar ratio of the activator C to the anhydride groups of the constituent Bb is at least equal to 0.5;

the thermoplastic polymers included in the definition of the constituents Aa and Ba are selected from the group consisting of the group consisting of $C_2$–$C_{12}$ alkene/$C_1$–$C_{12}$-alkyl (meth) acrylate copolymers, and the polymers of norbornene and/or of its derivatives;

the synthetic rubbers included in the definition of the constituents Aa and Ba are selected from the group consisting of styrene-diene-styrene block copolymers;

the tackifying resins Ac and Bc are selected from the group consisting of polyterpenes, colophonies and colophony esters as well as their hydrogenated derivatives, and petroleum resins;

the plasticizers Ad and Bd are selected from the group consisting of polyterpenes, colophonies and colophony esters as well as their hydrogenated derivatives, and petroleum resins;

the plasticizers Ad and Bd are selected from the group consisting of semi-aliphatic oils, polyisobutylenes of very low molecular weight and aromatic, naphthenic or paraffinic petroleum oils, alkylbenzenes, esters derived from saturated organic acids, and ethylene-vinyl acetate copolymers of very low molecular weight; and the activator C is selected from the group consisting of tertiary amines, phosphines, aryl or alkyl phosphonium halides and the tertiary amides of fatty acids.

2. System according to claim 1, characterized by the fact that the compound Ab contains at least one epoxy group.

3. System according to claim 2, characterized by the fact that the compound Ab is a polyepoxy compound of the general formula:

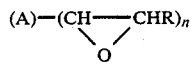

in which A is a polyfunctional group of valency $n \geq 2$, and R is a hydrocarbon radical or a hydrogen atom.

4. System according to claim 2, characterized by the fact that the compound Ab is a copolymer of at least one $C_2$–$C_8$ olefine with at least one unsaturated monomer containing an epoxy group.

5. System according to claim 1, characterized by the fact that the compound Bb is a polymer containing groups selected from the group consisting of the maleic, itaconic and phthalic anhydride groups.

6. System according to claim 5, characterized by the fact that the polymer Bb contains apart from groups derived from an anhydride, at least one of groups derived from at least one alkene and groups derived from at least one co-monomer $C_1$–$C_{12}$ alkyl acrylates and methacrylates.

7. System according to claim 1, characterized by the fact that the molar ratio of the activator C to the anhydride groups of the polymer Bb is at least equal to 1.

8. System according to claim 1, characterized by the fact that at least one of the compositions A and B contains up to 10 parts by weight, per 100 parts by weight of said composition, of at least one adjuvant chosen from waxes and paraffins.

9. System according to claim 1, characterized by the fact that the activator C is at least partially incorporated in the composition A and/or in the composition B.

10. System according to claim 9, characterized by the fact that the activator C is wholly incorporated in the composition A and/or in the composition B so as to form a two-component system.

11. Method for preparing a two-component system according to claim 10, characterized by the fact that the constituents of the composition A and those of the composition B are separately mixed at a temperature sufficient for obtaining homogeneous liquids, and that each of the two liquid mixtures is then cooled while incorporating the activator C in at least one of said compositions A and B.

12. Method according to claim 11, characterized by the fact that the temperature of mixing the constituents of each composition A and B is at least 10° C. higher than the softening point of said composition.

13. Method according to one of claims 11 or 12, characterized by the fact that the temperature of the composition at which the activator C is incorporated lies between 120° and 170° C.

* * * * *

UNITED STATES PATENT AND TRADEMARK OFFICE
CERTIFICATE OF CORRECTION

PATENT NO.   :   4,954,550
DATED        :   September 4, 1990
INVENTOR(S)  :   Kurt Sorg It is certified that error appears in the above-identified patent and that said Letters Patent is hereby corrected as shown below:

- Claim 1, column 11, line 19, delete "group consisting of the group consisting of" and insert -- group consisting of --

- Claim 1, column 11, lines 32-35, delete in its entirety, "the plasticizers Ad and Bd are selected from the group consisting of polyterpenes, . . . and petroleum resins;"

- Claim 6, column 12, line 17 after "Bb contains" insert a comma --,--.

Signed and Sealed this

Seventeenth Day of March, 1992

Attest:

HARRY F. MANBECK, JR.

*Attesting Officer*     *Commissioner of Patents and Trademarks*